United States Patent [19]
Sekine
[11] 4,173,758
[45] Nov. 6, 1979

[54] DRIVING CIRCUIT FOR ELECTROCHROMIC DISPLAY DEVICES

[75] Inventor: Mitsuo Sekine, Tokorozawa, Japan

[73] Assignee: Citizen Watch Co., Ltd., Tokyo, Japan

[21] Appl. No.: 822,355

[22] Filed: Aug. 5, 1977

[30] Foreign Application Priority Data

Aug. 17, 1976 [JP] Japan ........................ 51-97474

[51] Int. Cl.[2] ........................ G06F 3/14
[52] U.S. Cl. ........................ 340/785; 340/811
[58] Field of Search ........... 58/50 R; 340/336, 324 R, 340/324 M, 785, 763, 783, 811

[56] References Cited

U.S. PATENT DOCUMENTS

| | | | |
|---|---|---|---|
| 3,096,271 | 7/1963 | Hespenheide | 340/324 |
| 3,973,254 | 8/1976 | Nomiya et al. | 340/336 |
| 4,060,974 | 12/1977 | Natori | 58/50 R |
| 4,060,975 | 12/1977 | Yamaguchi | 58/50 R |

*Primary Examiner*—Marshall M. Curtis
*Attorney, Agent, or Firm*—Sherman & Shalloway

[57] ABSTRACT

In a driving circuit for an electrochromic display device of the type wherein a clock signal is applied to the common electrode segment, and a driving signal having a different level from that of the clock signal is applied to the display segment electrode in response to the clock signal and a display decoder output, thereby effecting display and termination thereof by using a single source, gate circuit means is provided for preventing short-circuiting of the electrodes caused by the delay time between the clock signal and the driving signal.

8 Claims, 7 Drawing Figures

DRIVING CIRCUIT FOR ELECTROCHROMIC DISPLAY DEVICES

BACKGROUND OF THE INVENTION

This invention relates to a driving circuit for driving an electrochromic (EC) display device by utilizing a single source of power.

There are two types of the driving circuits for driving EC display devices, one utilizing two sources and the other one source. According to the two source type driving circuit electrode connected to a common segment is maintained at an intermediate potential whereas the electrodes on the display side are applied with a higher potential than the electrode connected to the common segment at the time of interrupting the display, but with a lower potential than the electrode connected to the common segment at the time of display.

According to the single source type electrode connected to the common segment is supplied with a clock signal or the like and the clock signal is varied between a high level and a low level with a suitable timing. To extinguish the display, the clock signal is made to be at the low level when the driving signal is at the high level. To display an information the drive signal is made to be at the low level while the clock signal is at the high level.

Since the two source drive type requires to use two sources, it can be used for relatively large timepieces such as clocks but is not suitable for small timepieces as wrist watches. For this reason, the single source type driving circuit is generally used for wrist watches.

Among various methods of driving may be mentioned a first system of using a memory effect in which when a drive signal is applied and then removed for display and interruption of display, such states are continued by the memory effect, and a second system in which the driving signal is applied at a constant interval, the driving signal being a pulse signal having a definite period which is determined by taking into consideration the memory time of the electrochromic display device. The first system is generally used for the minute and second digits and in which the driving signal is applied only when the decoder output varies, whereas the second system is usually used for digits in which the display does not change for a relatively long time such as hour, day and month digits. When both the first and second systems are used at the same time, a different type display is also possible.

Although various types of driving circuit for EC display devices have been developed as will be described later in more detail, there was a disadvantage of short-circuiting the electrodes of the display device thus not only causing blur of the display but also increase the power consumption which results in the decrease of the life of the operating source.

SUMMARY OF THE INVENTION

Accordingly, it is an object of this invention to provide a novel driving circuit for an EC display device capable of eliminating the difficulties described above.

Another object of this invention is to provide a novel driving circuit of an electrochromic display device utilizing a single source and can operate display elements which are operated for a relatively short time or dispaly elements which are operated for a relatively long time or display elements of both types.

More specific object of this invention is to provide a novel driving circuit for electrochromic display devices utilized in timepieces.

According to this invention, these and further objects can be accomplished by providing a driving circuit for an electrochromic display device provided with a common segment electrode and a display segment electrode, wherein the driving circuit comprises means for applying a clock signal to the common segment electrode, and means for applying a driving signal to the display segment electrode in accordance with a display decoder output and the clock signal, the driving signal being at a different level from the level of the clock signal thereby effecting display and interruption of the display by using a single source, characterized by means for preventing short-circuiting of the electrodes caused by a delay time between the clock signal and the driving signal.

According to this invention, the interval of the driving signal is made to be shorter than that of the clock signal and gate means is provided to cause the driving signal to be generated within the interval of the clock signal.

DESCRIPTION OF THE PREFERRED EMBODIMENT

In the following description, there is illustrated only one of identical segments.

Figure 1:
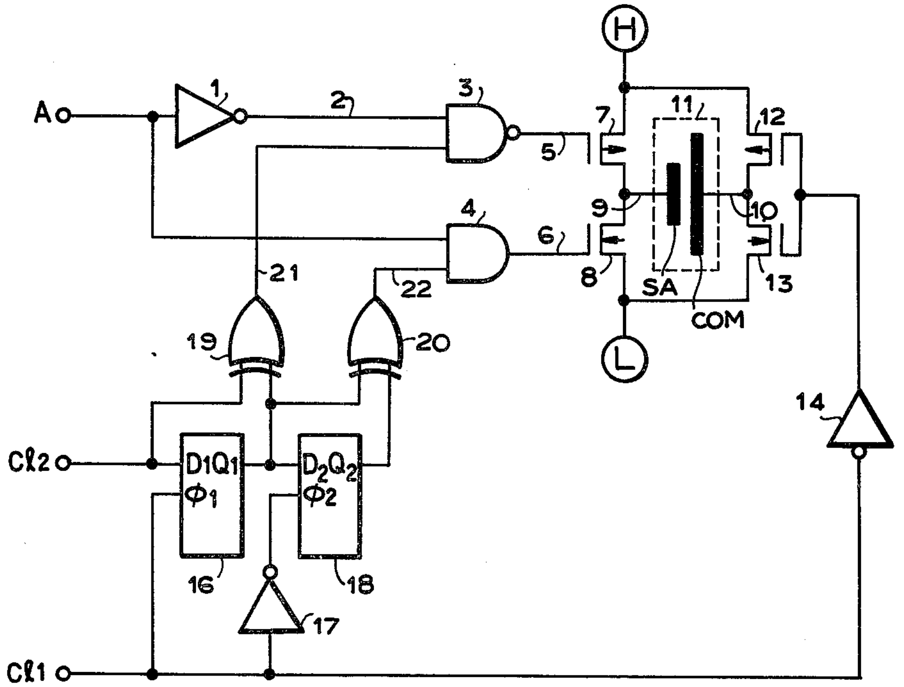
FIG. 1 (PRIOR ART)
FIG. 1 is a circuit diagram showing one example of the prior art driving circuit.
Figure 2:
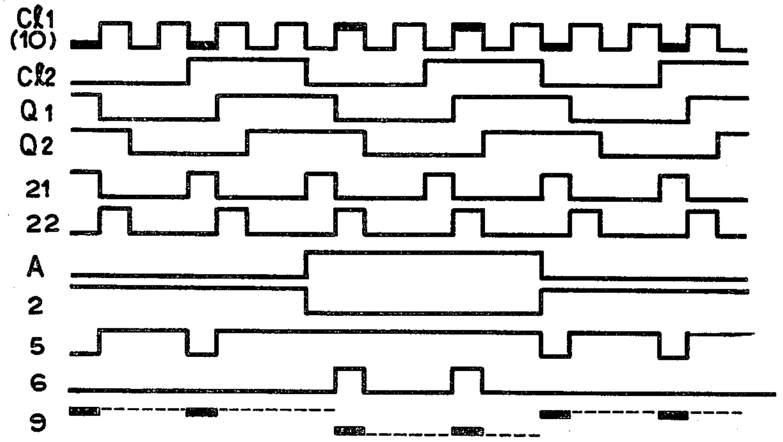
FIG. 2 (PRIOR ART)
FIG. 2 is a timing chart of a prior art driving circuit shown in FIG. 1.

In the prior art driving circuit shown in FIG. 1 which is constructed according to the first system described above, a decoder output A acting as a segment signal, clock signal $Cl_1$ that determines the pulse width of the driving signal and a clock signal $Cl_2$ which is determined by taking into consideration the memory time of the EC display device are applied to the input terminals of the driving circuit. Signals $Cl_1$ and $Cl_2$ are used to operate latches 16 and 18 respectively. The signal $Cl_2$ and the output $Q_1$ of the latch 16 are applied to an exclusive OR gate 19 whereas the output $Q_1$ of the latch 16 and the output $Q_2$ of the latch 18 are applied to the inputs of another exclusive OR gate 20. Latches 16 and 18 are of the type wherein they are triggered by the leading edge of the clock signals applied to their clock inputs $\phi_1$ and $\phi_2$ and produces output signals at their outputs $Q_1$ and $Q_2$ having the same potential as the data applied to their inputs $D_1$ and $D_2$. As shown, latches 16 and 18 are connected in cascade. For this reason, as shown in FIG. 2, the output $Q_1$ lags one half period of the clock signal $Cl_1$ with respect to the clock signal $Cl_2$ while the output $Q_2$ lags one half period of the clock signal $Cl_1$ with respect to the output Q. As a consequence, the output signal of the exclusive OR gate 19 forms a display signal 21 and the output signal of the OR gate 20 constitutes a display signal 22. Signal 21 is used to interrupt the display while signal 22 is used for display. Signals 21 and 22 have the same period and pulse width but have phases different by one half period of the signal $Cl_1$. This is the reason why the display and interruption are not made simultaneously by a clock signal applied to the common segment electrode of the EC display device 11. Accordingly, in order to simultaneously effect display and interruption the phases of signals 21 and 22 should be different by one half period of the clock signal $Cl_1$. Signal 21 and the decoder output A inverted by an inverter 1 are applied to the inputs of an NAND gate 3. Furthermore, display signal 22 and decoder output A are applied to the inputs of an AND gate circuit 4. The output 5 of the NAND gate circuit 3 and the output 6 of the AND gate circuit 4 are shown in FIG. 2. The output 6 is utilized to operate the display device whereas output 5 is utilized to interrupt the display. More particularly, output 5 is applied to the gate electrode of a P-channel MOS transistor 7 (hereinafter called as P-MOS transistor), while the output 6 is applied to the gate electrode of an N-channel MOS transistor 8 (hereinafter called as N-MOS transistor). The source electrode of the P-MOS transistor 7 is connected to a source of high level H whereas the source electrode of the N-MOS transistor 8 is connected to a source of low level L. The drain electrodes of both transistors are commonly connected to a display segment SA. Thick portions of a driving signal 9 shown in FIG. 2 are applied to the display segment electrode SA show that the P-MOS transistor 7 connected to the high level source H is turned ON and the N-MOS transistor 8 connected to the low level source L is also turned ON whereas dotted line portions show that both transistors are OFF. A clock signal 10 applied to the common segment electrode COM is the same as signal $Cl_1$. There are also provided a P-MOS transistor 12 and an N-MOS transistor 13 which are connected to act as an inverter and their gate electrodes are supplied with signal $Cl_1$ via an inverter 14. In order to ensure an accurate and clear display, it is advantageous to use MOS transistors having a small ON resistance.

Figure 3:
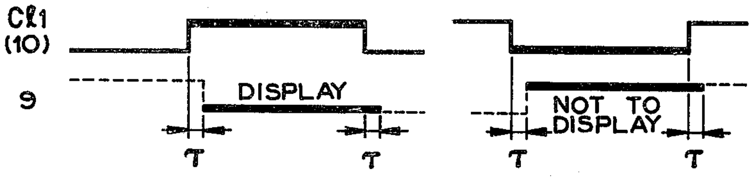
FIG. 3 (PRIOR ART)
FIG. 3 is waveforms showing the time delay between a driving signal and a clock signal of the prior art driving circuit shown in FIG. 1.

FIG. 3 shows a phase relationship between the driving signal 9 and the clock signal 10 utilized in the prior art EC display device shown in FIG. 1. As shown in FIG. 3, the driving signal 9 lags by $\tau$ than the clock signal 10. The lagging time $\tau$ is proportional to the number of elements utilized to produce the driving signals, in other words $\tau$ increases as the number of the elements increases. Due to this time delay, immediately before termination of the driving signal, the driving signal and the clock signal 10 assume the same potential with the result that the electrodes SA and COM are short-circuited. Accordingly, an electric charge stored in the display device is discharged to blur the display. Such short-circuiting causes increase in the power consumption thus shortening the life of a battery utilized to operate the display device.

Figure 4:
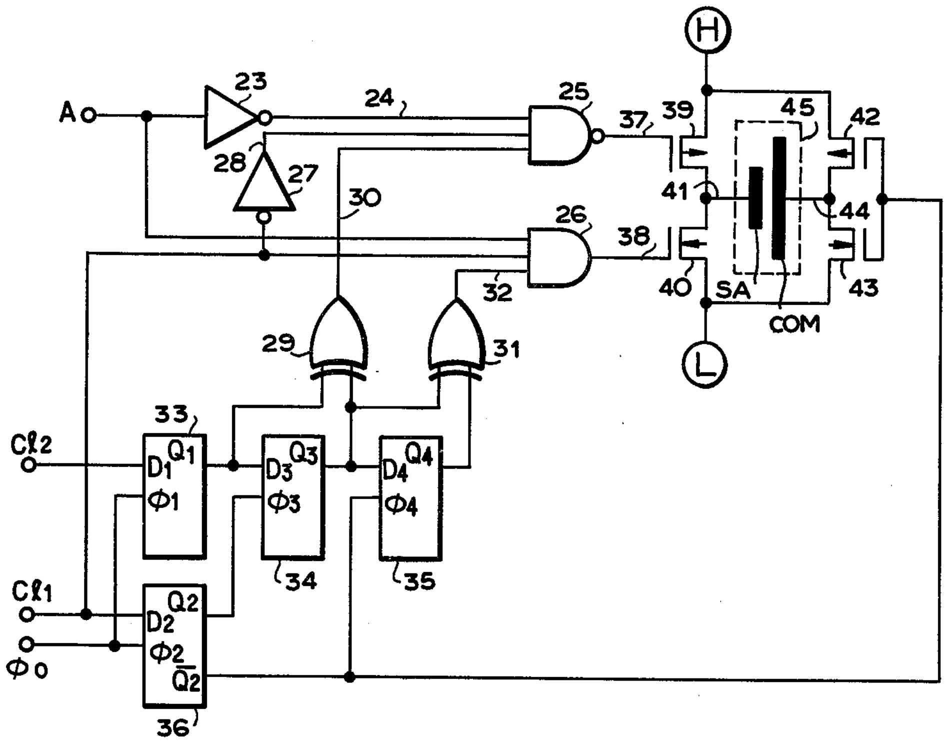
FIG. 4 is a block diagram showing one example of the driving circuit embodying the invention.

Turning now to FIG. 4 which illustrates a preferred embodiment of this invention, decoder output A and signals $Cl_1$ and $Cl_2$ are identical to those described with reference to FIG. 1. In FIG. 4, reference numerals 23 and 27 designate inverters, 25 a three input NAND gate, 26 a three input AND gate, 29 and 31 exclusive OR gate and 33 through 36 latches. These elements are connected as shown.

The display device shown in FIG. 4 operates as follows.

Signal $Cl_1$ is applied to the input $D_2$ of the latch 36 and signal $Cl_2$ to the input $D_1$ of the latch 33. Signal $\phi_o$ is applied to the inputs $\phi_1$ and $\phi_2$ of the latches 33 and 36. Signal $\phi_o$ has a relatively higher frequency than signals $Cl_1$ and $Cl_2$. Due to this signal $\phi_o$ the output $Q_1$ of the latch 33 lags one half period of signal $\phi_o$ than the signal $Cl_2$ of the latch 33. In the same manner the output $Q_2$ of the latch 36 lags one half period of signal $\phi_o$ than signal $Cl_1$. The output $Q_1$ of the latch 33 and the output $Q_2$ of the latch 36 are applied to the inputs $D_3$ and $\phi_3$ of latch 34, respectively and the output $Q_3$ of the latch 34 and the output $\overline{Q_2}$ of latch 36 are applied to the input $D_4$ and $\phi_4$ of latch 35, respectively, to obtain output $Q_3$ from latch 34 and output $Q_4$ from latch 35. The output $Q_1$ of the latch 33 and the output $Q_3$ of the latch 34 are applied to the inputs of the exclusive OR gate 29, while the output $Q_3$ of the latch 34 and the output $Q_4$ of the latch 35 are applied to the inputs of the exclusive OR gate 31 for producing display signals 30 and 32 respectively. The operation of the latches and the relationship among outputs $Q_1$, $Q_3$ and $Q_4$ and display signals 30 and 31 are identical to those described in connection with FIGS. 1 and 2. Signal 24 obtained by inverting decoder output A by inverter 23, signal 28 obtained by inverting signal $Cl_1$ by inverter 27 and the display signal 30 are applied to the inputs of the NAND gate 25 while the display signal 32, decoder output A and signal $Cl_1$ are applied to the inputs of AND gate 26. The output signal 37 of the NAND gate 25 is applied to the gate electrode of a P-MOS transistor 39 and the output 38 of the AND gate 26 is applied to the gate electrode of an N-MOS transistor 40. The source electrode of the P-MOS transistor 39 is connected to a source of high level H while the source electrode of the N-MOS transistor 40 is connected to a source of low level L. The drain electrodes of both transistors 39 and 40 are commonly connected to the segment electrode SA of the display device 45. The output $\overline{Q_2}$ of latch 36 is impressed upon the gate electrodes of a P-MOS transistor 42 and an N-MOS transistor 43 which constitute an inverter, the output thereof is connected to the common segment electrode COM of the display device. Again, it is advantageous to use MOS transistors 39, 40, 42 and 43 having a small ON resistance.

The NAND gate 25 produces a low level output when the output 24 of the inverter 23, the signal 28 produced by inverting the clock signal $Cl_1$ by inverter 27 and the display signal 30 produced by the exclusive OR gate 29 are all at a high level, but produces a high level output in other cases. When signal 37 is at the low level P-MOS transistor 39 is turned ON to produce a high level output from its drain electrode whereas when the signal 37 is at the high level, the P-MOS transistor 39 is turned OFF. The AND gate circuit 26 produces a high level output 38 when the decoder output A, signal $Cl_1$ and the display signal produced by the exclusive OR gate 31 are all at the high level but produces a low level output on other cases. For this reason, the N-MOS transistor 40 is turned ON when the signal 38 is at the high level to produce a low level output from the drain electrode whereas this transistor is turned OFF when the signal 38 is at the low level.

Figure 5:
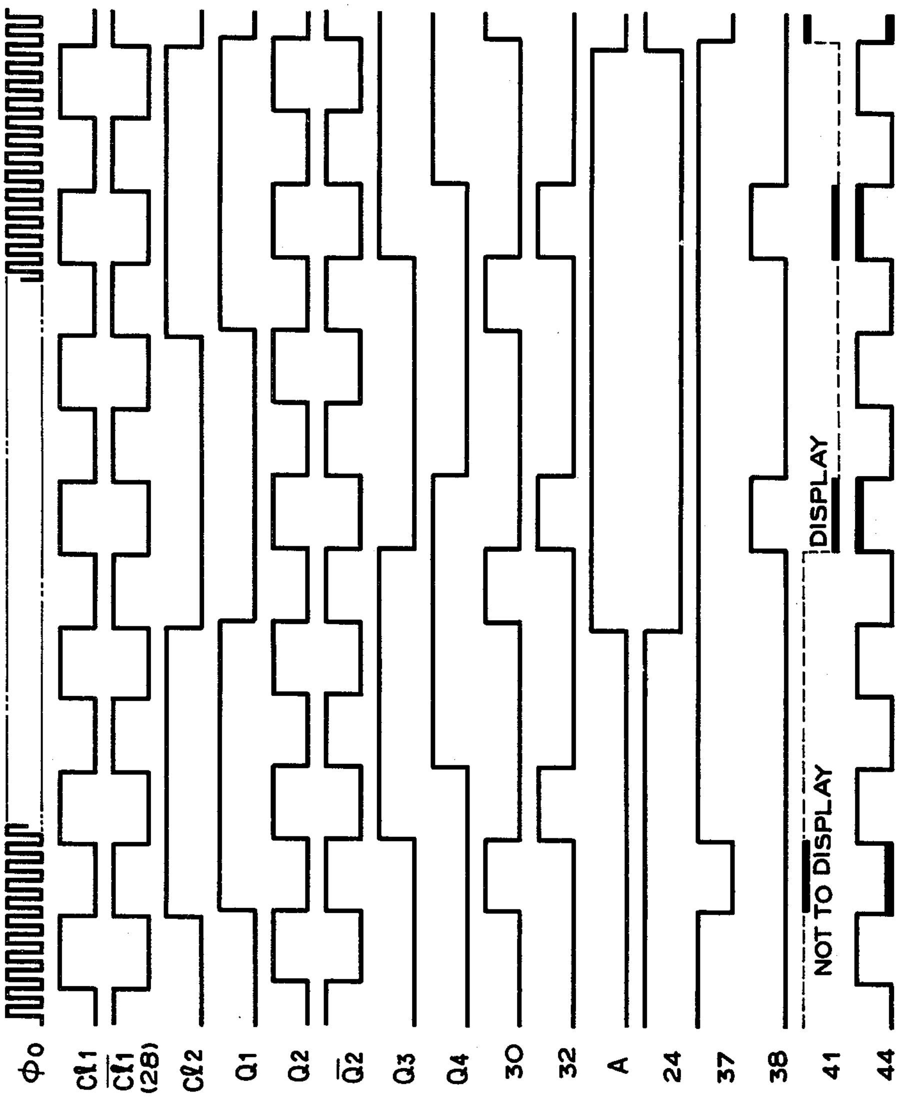
FIG. 5 is a timing chart of the driving circuit shown in FIG. 4.
Figure 6:
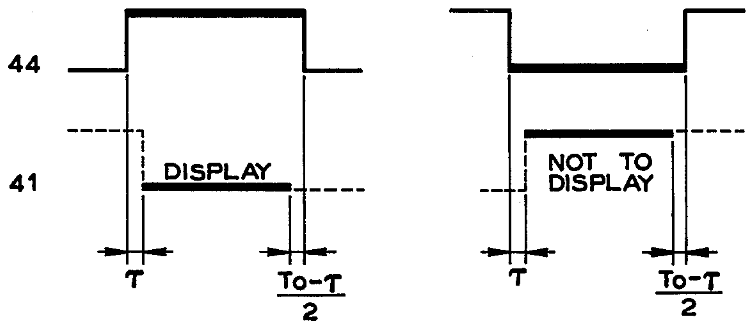
FIG. 6 is waveform showing the phase relationship between the driving signal and the clock signal utilized in the driving circuit shown in FIG. 4.

The interval in which the signal 37 assumes the low level is shorter than the pulse width of the display signal 30 by one half cycle of signal $\phi_o$ since the last portion of the display signal 30 is cancelled by the inverter output 28. In the same manner, the interval in which the signal 38 assumes the low level is shorter than the pulse width of the display signal 32 by one half cycle of the signal $\phi_o$ since the last portion of the display signal 32 is cancelled by the clock signal $Cl_1$. For this reason, the driving signal 41 will have a waveform as shown in FIG. 5. The clock signal 44 impressed upon the common segment electrode COM is equal to the output $Q_2$ of the latch 36. Accordingly, the interval of driving signal 41 impressed upon the display segment electrode SA is shorter than one half cycle of the clock signal 44 impressed upon the common segment electrode. FIG. 6 is an enlarged diagram showing the waveform of this state. The thick and dotted line portions shown in FIGS. 5 and 6 have the same meaning as above described. From this it can be understood that whether the driving signal 41 is at the high level or at the low level, the first portion of the driving signal 41 lags from the clock signal 44 by a delay time $\tau$ which is caused by the number of circuit elements utilized to form the driving signal 41 whereas the last portion of the driving signal terminates at a point earlier than the clock signal 44 by $(T_o/2-\tau)$ where $T_o$ represents the period of the signal $\phi_o$. Consequently, the pulse width of the driving signal 41 is narrower than one half cycle of the clock signal 44 and yet the driving signal 41 is produced within one half cycle of the clock signal 44. Accordingly, the short circuit caused by the delay time between the driving signal and the clock signal can be efficiently precluded.

While in the foregoing description a driving circuit for a display segment electrode SA was described it will be clear that driving circuit of this invention is also applicable to the other identical display segments. Furthermore, in the foregoing description a driving circuit of the second system has been described it is also possible to construct the driving circuit according to the first system or a combination of the first and second systems.

Figure 7:
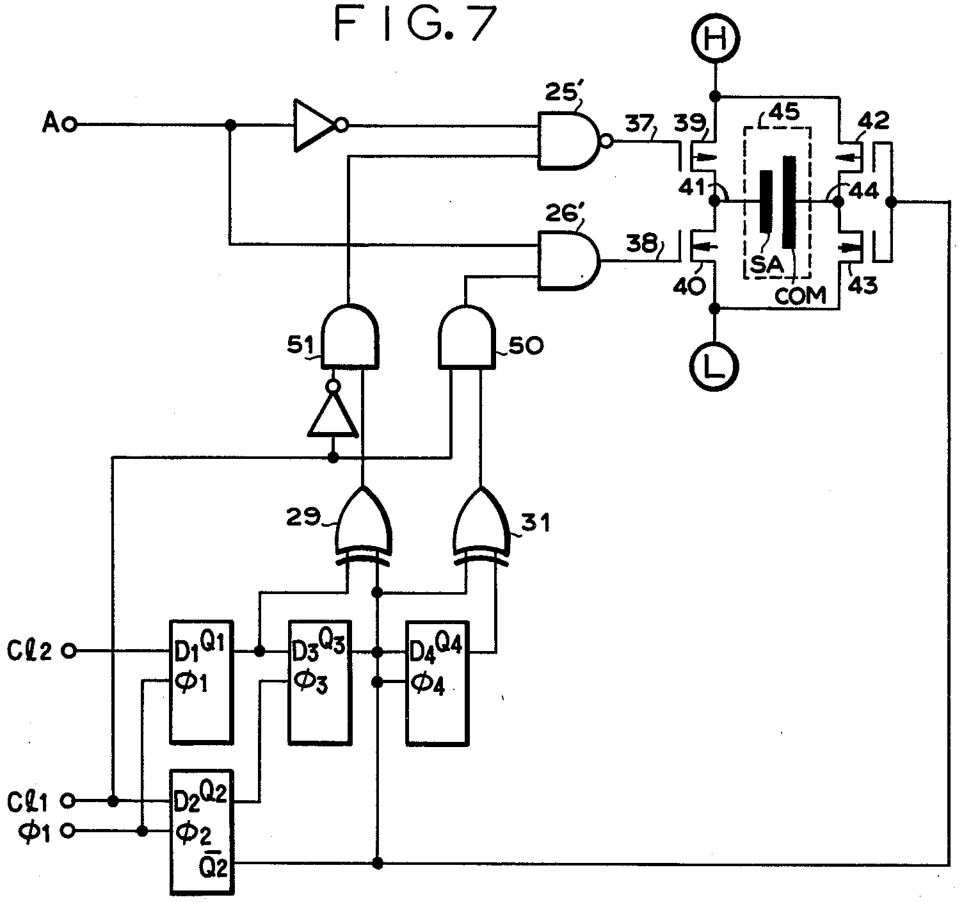
FIG. 7 is a block diagram illustrating another embodiment of this invention.

FIG. 7 shows a modified embodiment of this invention which is an improvement of the embodiment shown in FIG. 4 and has smaller number of circuit elements. More particularly in the embodiment shown in FIG. 4, signals 37 and 38 constituting the driving signal were formed by applying to the inputs of the NAND gate 25 the inverted signal 24 of the decoder output A, inverted signal 28 of signal $Cl_1$ and the display signal 30 and by applying to the inputs of the AND gate 26 the decoder output A, signal $Cl_1$ and the display signal 32. However, since the three input NAND gate and the three input AND gate are necessary for each display segment, in an ordinary miniature electronic device, for example, a wrist watch, which utilizes a relatively large number of the display segments requires a large number of three input NAND gates and three input AND gates.

To solve this difficulty, in the embodiment shown in FIG. 7 two input AND gates 50 and 51 are added, and to the inputs of the AND gate 50 are applied signal $Cl_1$ and the display signal 32 produced by the exclusive OR gate 31 whereas the inputs of the other AND gate 51 are connected to be applied with the inverted signal of signal $Cl_1$ and the display signal produced by the exclusive OR gate 29. The inversion of the decoder output A and the output of AND gate 51 are applied to the inputs of a two input NAND gate 25' while the decoder output A and the outputs of the AND gate 50 are applied to the inputs of a two input AND gate 26' for forming driving signals. As described above, the outputs of the two input AND gates are applied to one inputs of the two input NAND gate 25' and two input AND gate circuit 26' respectively for forming the driving signals for respective display segments so that it is possible to use gates less expensive than those of the embodiment shown in FIG. 4. The embodiment shown in FIG. 7 operates in the same manner as that shown in FIG. 4.

As above described, according to this invention since the width of the driving signal is made smaller than the width of one half cycle of the clock signal and since the driving circuit is so constructed that the driving signal is produced within one half cycle of the clock signal discharge of electric charge accumulated in the EC display device caused by short circuiting of the electrodes can be prevented thereby assuring clear display. Moreover, it is possible to decrease the power consumption, thereby prolonging the life of a battery cell utilized to operate the display device.

What is claimed is:

1. A driving circuit for an electrochromic display device provided with a common segment electrode and a display segment electrode, said driving circuit comprising means for applying a common segment signal to said common segment electrode, and means for applying a driving signal to said display segment electrode in accordance with a display decoder output and said common segment signal, said driving signal being at a different level from the level of said common segment signal, thereby effecting display and interruption of the display by using a single source, the improvement comprising means for preventing short-circuiting of the electrodes caused by a delay time between said common segment signal and said driving signal, said means including a delay means for delaying said common segment signal so that said driving signal is enclosed within a time pulse of said common segment signal.

2. The driving circuit according to claim 1 wherein said shortcircuit preventing means further comprises means for determining the interval of said driving signal to be within the interval of said delayed common segment signal and for causing said driving signal to be produced within said interval of the delayed common segment signal.

3. The driving circuit according to claim 2 wherein said driving signal is generated by means responsive to said common segment signal before and after delay and responsive to said display decoder output.

4. The driving circuit defined in claim 3 wherein the common segment signal is a clock signal.

5. A driving circuit for an electrochromic display device with a common segment electrode and a display segment electrode, said driving circuit comprising first means for applying a common segment signal having pulses to the common segment electrode and second means for applying a driving signal to the display segment electrode, the driving signal being comprised of pulses each of which has a width narrower than that of the corresponding pulse of the common segment signal and produced within the common segment signal pulse resulting in a zero level of the driving signal before a potential of the corresponding pulse of the common segment signal changes from high to low and vice versa, thereby eliminating a short-circuit state between the common segment and the display segment electrodes which is caused when there is a delay time between the common segment signal and the driving signal.

6. The driving circuit defined in claim 5 wherein the common segment signal is a clock signal.

7. A driving circuit for an electrochromic display device with a common segment electrode and a display segment electrode, said driving circuit comprising first means for applying a common segment signal to the common segment electrode and second means for applying a driving signal having pulses to the display segment electrode, the common segment signal being comprised of pulses each of which has a width narrower than that of the corresponding pulse of the display segment signal and produced within the display segment signal pulse resulting in a zero potential of the common segment signal before a level of the corresponding pulse of the driving signal changes from high to low and vice versa, thereby eliminating a short-circuit state between the common segment and the display segment electrodes which is caused when there is a delay time between the common segment signal and the driving signal.

8. A driving circuit for an electrochromic display device with a common segment electrode and a display segment element, said driving circuit comprising first means for applying a common segment signal to the common segment electrode and second means for applying a driving signal to the display segment electrode, the first and second means controlling a potential difference between the driving signal and the common segment signal so that the potential difference is high or low only during the energization of the electrochromic display device and is zero after the commencement or extinguishment of the display device, thereby eliminating a short-circuit state between the common segment and the display segment electrodes which is caused when there is delay time between the common segment signal and the driving signal.

* * * * *